T. S. NEWBY.
SAFETY SIGNAL FOR AUTOMOBILES.
APPLICATION FILED MAY 4, 1918.
1,315,634.
Patented Sept. 9, 1919.
2 SHEETS—SHEET 1.
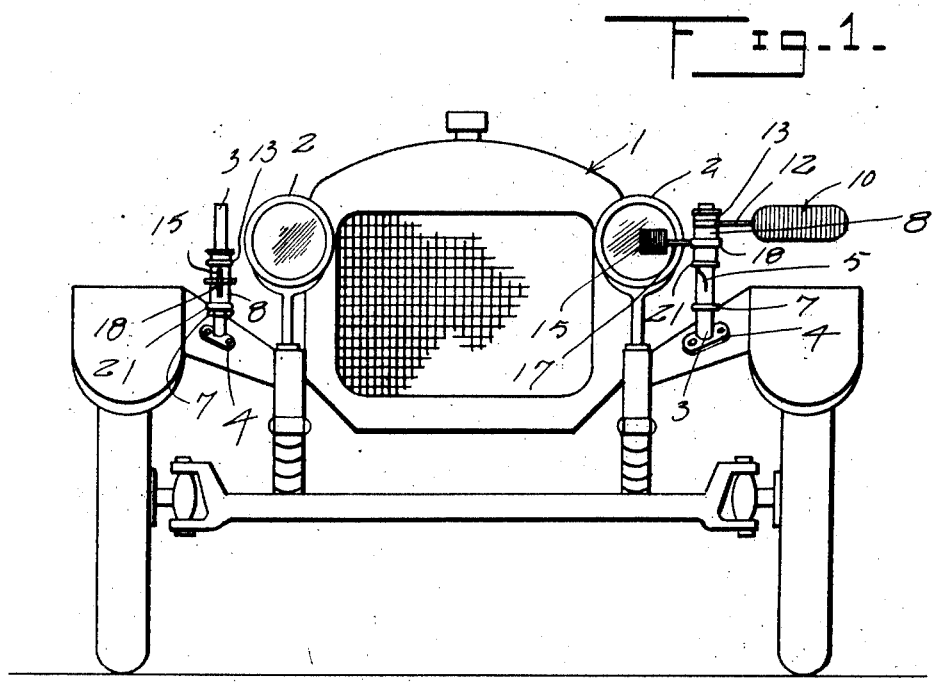
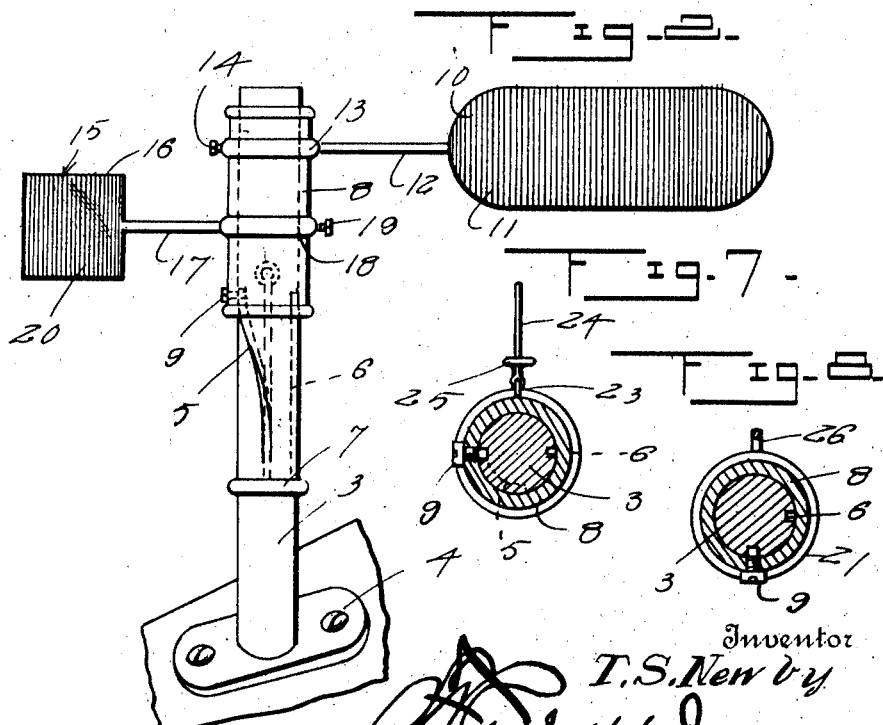

T. S. NEWBY.
SAFETY SIGNAL FOR AUTOMOBILES.
APPLICATION FILED MAY 4, 1918.
1,315,634.
Patented Sept. 9, 1919.
2 SHEETS—SHEET 2.
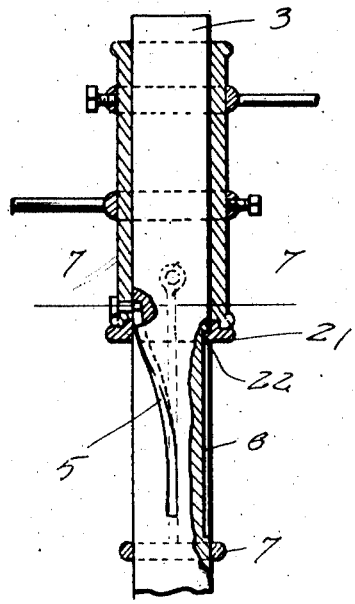
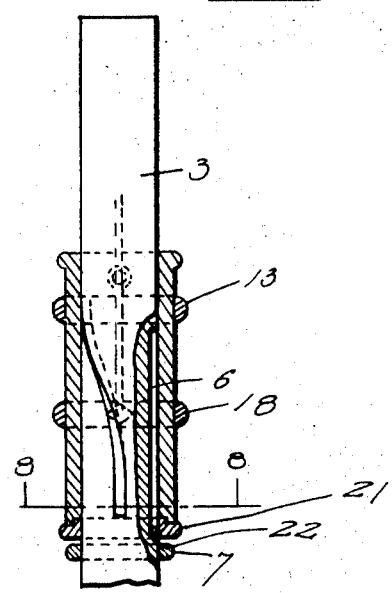
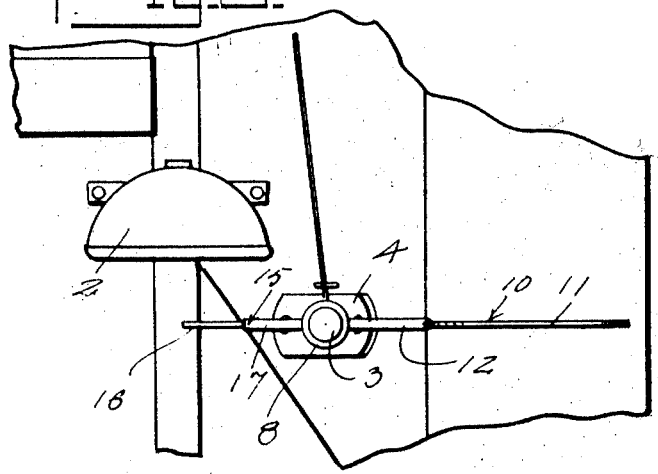
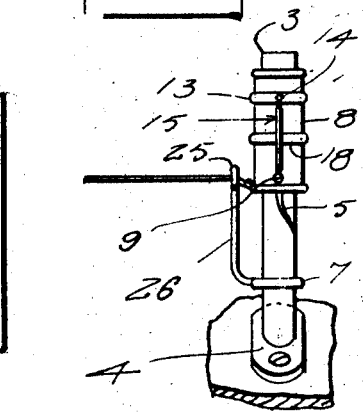
Inventor
T. S. Newby.
By
Attorney

UNITED STATES PATENT OFFICE.

THOMAS S. NEWBY, OF TERRE HAUTE, INDIANA.

SAFETY-SIGNAL FOR AUTOMOBILES.

1,315,634. Specification of Letters Patent. Patented Sept. 9, 1919.

Application filed May 4, 1918. Serial No. 232,540.

*To all whom it may concern:*

Be it known that I, THOMAS S. NEWBY, a citizen of the United States, residing at Terre Haute, in the county of Vigo and State of Indiana, have invented certain new and useful Improvements in Safety-Signals for Automobiles; and I do hereby declare the following to be a full, clear, and exact description of the invention, such as will enable others skilled in the art to which it appertains to make and use the same.

This invention relates to improvements in safety signals for automobiles and has for one of its objects the provision of a device of this character which can be readily applied to an automobile for the purpose of indicating to traffic the direction in which a turn is to be made.

Another object of this invention is the provision of a pivotally mounted signal adapted to be swung transversely of the automobile to indicate that a turn from a straight course is to be made and which will move in front of the lights of the automobile so as to make the same visible at night time.

A further object of this invention is the provision of means for turning the signal into signaling and non-signaling positions at the will of the operator of the automobile.

A still further object of this invention is the provision of a safety signal for automobiles of the above stated character, which shall be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a front elevation of a safety signal for automobiles constructed in accordance with my invention, Fig. 2 is an enlarged front elevation of the signal, Fig. 3 is a top plan view of the same, Fig. 4 is a side elevation illustrating a controlling cord attached to the signal, Fig. 5 is a fragmentary vertical sectional view illustrating the means of moving the signal into signaling position, Fig. 6 is a similar view illustrating the means occupying a non-signaling position, Fig. 7 is a transverse sectional view taken on the line 7—7 of Fig. 5, Fig. 8 is a similar view taken on the line 8—8 of Fig. 6.

Referring in detail to the drawings, the numeral 1 indicates an automobile to which my invention is applied and it is to be noted that a signal is placed upon each side of the automobile and supported by the mud guards thereof so that when the signal moves into a signaling position, a portion thereof will be disposed in front of the headlights so that the same will be visible at night time. If desired, a signal may also be placed upon the rear of the automobile and be illuminated by the ordinary tail light carried by the automobile. The signals are arranged on each side of the automobile, as illustrated in Fig. 1, for the purpose of indicating that a turn is to be made either to the right or to the left and reference to one is thought to be sufficient for both as both are identical in construction.

A standard 3 is secured or formed upon a bracket 4 secured to the mud guard in any well known manner and is provided with a spiral groove 5 and a vertical groove 6. A stop or collar 7 is formed upon the standard 3 at the lower ends of the grooves 5 and 6, as clearly illustrated in Fig. 2, for limiting the downward movement of a sleeve 8. The sleeve 8 is mounted upon the standard 3 and is free to turn upon the same. A set screw 9 is carried by the sleeve 8 and rides in the groove 5 for causing the sleeve to rotate as the same slides upwardly and downwardly upon the standard 3. A signaling member 10 consisting of a flat portion 11 painted or coated in any desired color but preferably red and having formed upon one end thereof a rod 12 carried by a collar 13. The collar 13 is mounted upon the sleeve 8 and is held against movement thereon by means of a set screw 14. A signal 15 consists of a frame 16 carried by a rod 17 formed upon a collar 18 secured to the sleeve 8 by a set screw 19. The frame 16 carries a glass panel 20 coated or painted any desired color, preferably red. The signals are disposed in opposite directions in relation to the standard 3 as illustrated in Fig. 2 and in their normal position they extend parallel of the automobile with the signal 15 disposed forwardly and the signal 10 disposed rearwardly.

A collar 21 is mounted upon the standard 3 and is swivelly connected to the lower end of the sleeve 8 and is provided with a projection 22 that rides in the vertical slot 6 of the standard 3 to prevent the same from rotating during the upward and downward movement of the sleeve 8. An eye 23 is formed upon the collar 22 and has connected to one end thereof an operating cable 24 that extends through an eye 25 carried by an arm 26 supported by the stop 7. The other end of the cable 24 is disposed in convenient reach to the operator of the automobile so that upon pulling upon the same, the sleeve 8 will be raised upwardly into a position as illustrated in Fig. 2. As the sleeve 8 moves upwardly, it is compelled to turn or rotate upon the standard 3 by the groove 5 and groove 9 causing the signals 15 and 10 to move into signaling position, as illustrated in Fig. 1, indicating that a turn from a straight course is to be made. Upon releasing the cable 24, the sleeve 8 is returned to its lowermost position by gravitation and simultaneously rotates returning the signal to a non-signaling position.

While I have shown and described the preferred embodiment of my invention it will be understood that minor changes in construction, combination and arrangement of parts may be made without departing from the spirit and scope of the invention as claimed.

Having thus described my invention, what I claim is:

1. A signal comprising a standard, a sleeve slidable on said standard, means limiting the downward movement of said sleeve on said standard, oppositely disposed signals carried by said sleeve, means sliding said sleeve on said standard, and means causing said sleeve to rotate during sliding movement on the standard to move the signals into and out of signaling position and to position one of the signals in front of the lamp of an automobile during the movement of the sleeve in one direction.

2. A signal comprising a standard, a sleeve slidable on said standard, a collar on said standard for supporting and limiting the downward movement of said sleeve, a signal carried by said sleeve, an arm carried by said collar and having an eye, an operating cable extending through the eye, means connecting said cable to said sleeve for raising the sleeve upwardly upon the standard, and means causing said sleeve to rotate during its sliding movement to move the signal into and out of signaling position.

3. A signal comprising a standard, a sleeve slidable on said standard, said standard having a curved slot and a vertical slot, a signal secured to said sleeve, a collar swiveled to the lower end of said sleeve and having a projection riding within the vertical slot, a set screw carried by said sleeve and riding in the curved slot to cause said sleeve to rotate during its upward and downward movement upon the sleeve, and means connected to the sleeve for raising the same upwardly to move the signal into signaling position and adapted to be released to permit the sleeve to move downwardly by gravitation to return the signal to a non-signaling position.

4. A signal comprising a standard, a sleeve slidable on said standard, rings adjustably secured to said sleeve, arms carried by said rings and extending in opposite directions, signals carried by said arms, one of said signals being transparent, means sliding said sleeve on said standard, and means causing said sleeve to rotate during its sliding movement to move the transparent signal in front of one of the lights of the automobile and the other signal transversely of the automobile to indicate that a turn is to be made.

In testimony whereof I affix my signature in presence of two witnesses.

THOS. S. NEWBY.

Witnesses:
E. S. BURTON,
J. K. KELLER.

Copies of this patent may be obtained for five cents each, by addressing the "Commissioner of Patents, Washington, D. C."